Dec. 22, 1953   A. J. SCHUTT   2,663,499
TEMPERATURE CONTROL VALVE
Filed Nov. 2, 1949   3 Sheets-Sheet 1

Inventor
Arthur J. Schutt
By Willits, Helmig & Baillio
Attorneys

Dec. 22, 1953    A. J. SCHUTT    2,663,499
TEMPERATURE CONTROL VALVE
Filed Nov. 2, 1949    3 Sheets-Sheet 2

Inventor
Arthur J. Schutt
By Willits, Helwig & Baillio
Attorneys

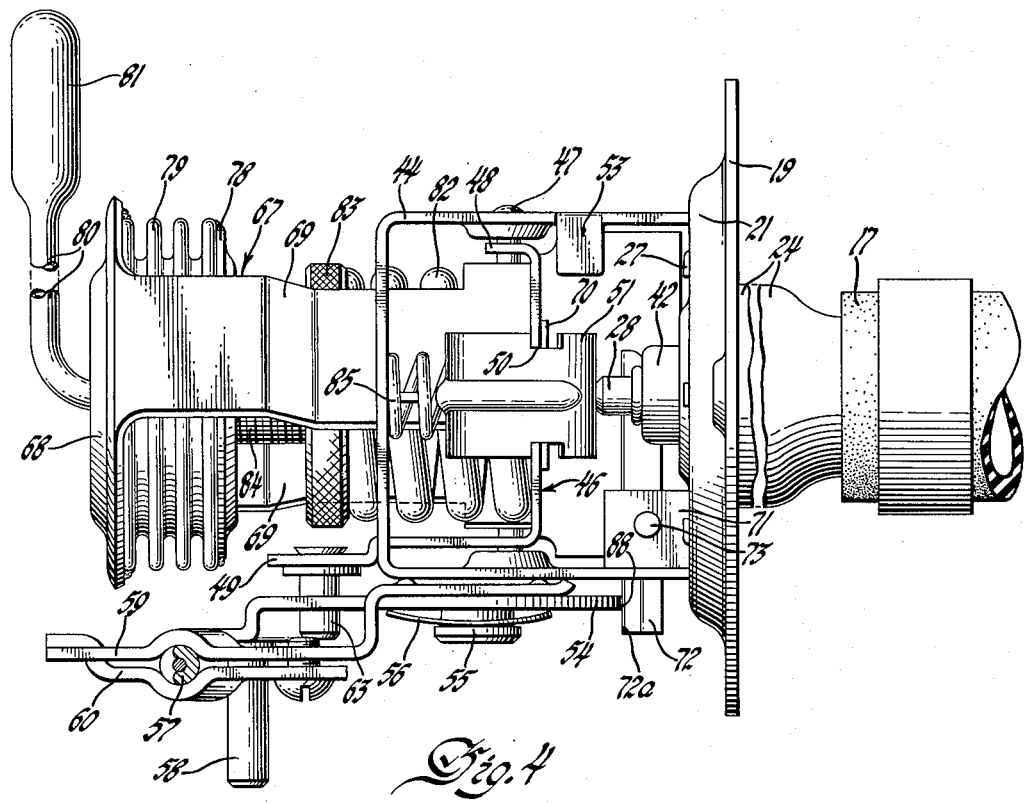
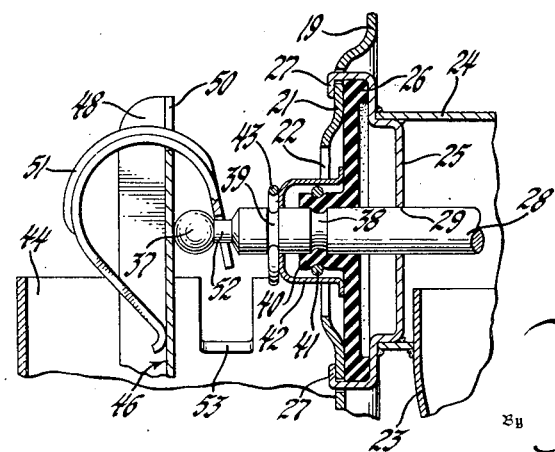

Patented Dec. 22, 1953

2,663,499

UNITED STATES PATENT OFFICE 2,663,499

TEMPERATURE CONTROL VALVE

Arthur J. Schutt, Lockport, N. Y., assignor to General Motors Corporation, Detroit, Mich., a corporation of Delaware Application November 2, 1949, Serial No. 125,029

12 Claims. (Cl. 236—42)

This invention relates to temperature control valves particularly adapted for controlling the flow of a fluid to a heat exchanger.

One of the important objects of this invention is to provide a control device of this character having thermo-responsive means adjustable to actuate the valve within different ranges of temperature variation.

Another object of this invention is to provide a control valve of this type in which the static positions of the thermo-responsive control means may be varied by remote control and to adjust the device to various ambient air temperatures.

Another object of the invention is to provide a temperature control valve of this type wherein the parts may be adjusted to lock the valve in either fully opened or fully closed position whereby the valve will not be operated upon changes in the ambient air temperatures.

Another object of this invention is to provide a device of this character which is simple in construction, comprises a relatively few number of parts and may be economically and expeditiously manufactured and assembled.

Various other objects, advantages and novel details of construction of this invention will become more apparent as this description proceeds, especially when considered in connection with the accompanying drawings, in which, Figure 1 is a fragmentary side elevational view partly broken away and partly in section of a motor vehicle provided with an air heating system incorporating this invention;

Figure 4 is an enlarged end elevational view as viewed from the top in Figure 2, as indicated by arrows 4—4 in Figure 2;

Figure 5 is an enlarged sectional view of the connection between the valve stem and valve control lever of the device.

Figure 1:
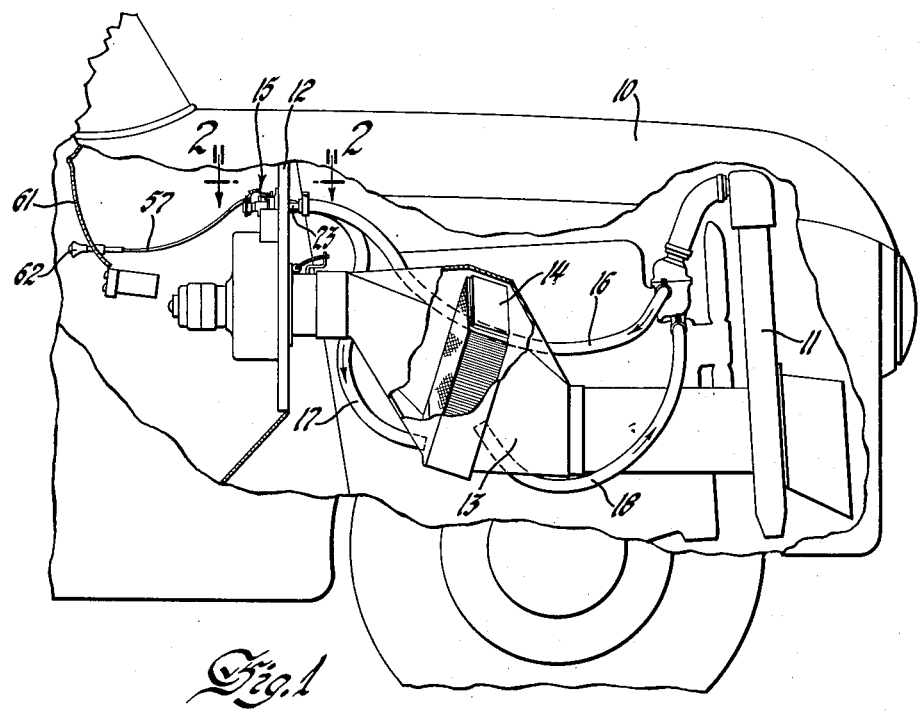

Referring now to the drawings and more particularly to Figure 1, it will be noted that there is illustrated, fragmentarily, the front portion of a motor vehicle 10 provided with the usual water cooling radiator 11. The reference character 12 indicates the dashboard of the motor vehicle. Interposed in an air conduit 13 extending from the front of the vehicle to and through the dash 12 is a heat exchanger 14.

The particular temperature control valve forming the subject matter of this invention is indicated generally by reference character 15.

As shown in Figure 1, hot water from the radiator flows through conduit 16 through the temperature control valve 15, then through conduit 17 to the heat exchanger 14 from which it returns by conduit 18 to the radiator 11.

Any other desired system of conduits or connections may be employed, it being essential only in this invention that the control valve be so interposed in the system of conduits that the flow of the heating fluid to the heat exchanger is controlled.

The particular control valve forming the subject matter of this invention is illustrated in detail in Figures 2 to 5 inclusive, in which the reference character 19 indicates a base member peripherally secured as at 20 to the dash 12. Intermediate its periphery and substantially throughout its length, the base 19 is formed with a pressed-out boss 21 which boss portion is apertured as at 22.

The reference character 23 indicates a pipe to which the conduit 16 is connected and the reference character 24 indicates a second pipe to which conduit 17 is connected. The pipe 23 is brazed or otherwise secured to the pipe 24 and the pipe 24 is brazed or otherwise secured to a circular cap or closing member 25. This member 25 is adapted to receive and support a rubber seal 26 as best illustrated in Figure 5. The assembly consisting of pipes 23 and 24 and the cap or closing member 25 are adapted to be assembled with and secured to the base 19 by having lips or tab portions 27 on the cap member 25 passed through slots in the base 19, said lips or tabs being subsequently bent over and staked or welded to the base as illustrated.

The reference character 28 indicates a valve shaft which extends through and is guided by an aperture 29 in the cap or closing member 25. One end of this valve stem 28 is provided with a semi-spherical or ball-shaped end 30 to which a coupling member 31 is attached by spinning the same thereon. The reference character 32 indicates a valve and 33 a valve guide mounted on the coupling 31. A washer 34 engages one face of the valve 32 and these three parts are secured in position by clinching over the end of the coupling 31 as indicated at 35. With this construction the valve 32 is capable of limited universal movement to seat firmly on the valve seat and the valve guide 33 assists in properly seating the valve.

Figure 2:
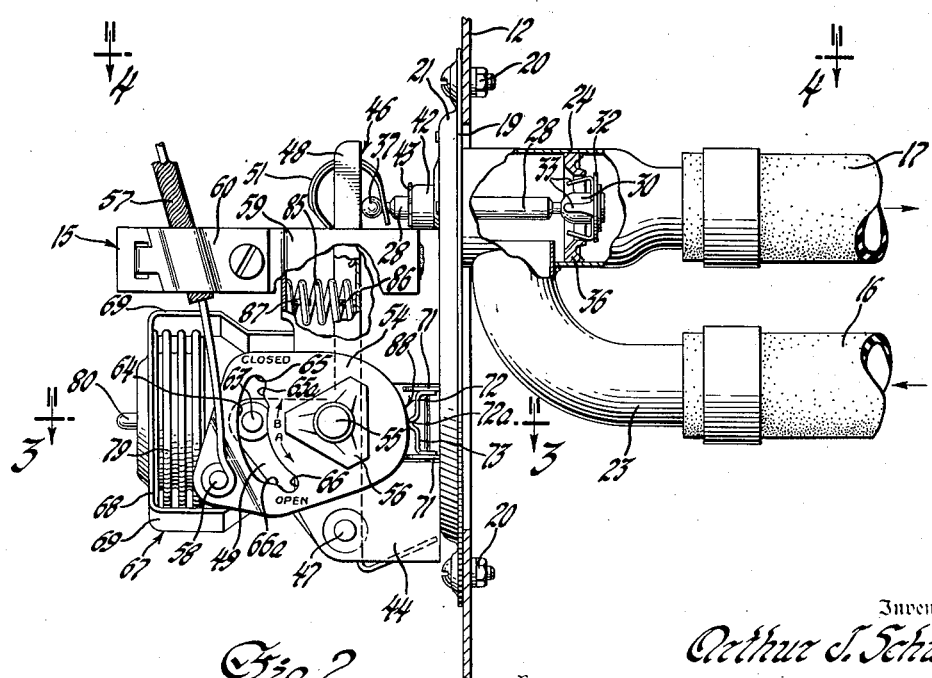
Figure 2 is an enlarged elevational view partly in section taken substantially on the plane indicated by line 2—2 in Figure 1.

A valve seat 36 is pressed into the pipe 24 and is preferably secured thereto by brazing. In Figure 2 the valve is shown in open position.

The other end 37 of the valve stem 28 is also semi-spherical and adjacent this end of the valve stem is provided with circular grooves 38 and 39. The rubber seal 26, previously referred to, is in the form of a diaphragm and has a circular sleeve portion 40 which surrounds the valve stem 28 at the groove 38 and is secured thereto by a clamp ring 41. A cup-like ferrule member 42 surrounds the valve stem 28 and encloses the sleeve portion 40 of the seal 26. This ferrule is held in place by a hairpin type securing member 43 engaging in said groove 39. When the valve stem 28 is reciprocated, the rubber seal 26 will flex to permit this reciprocal movement.

Secured to the base 19 is a substantially U-shaped case or housing 44. This housing is provided at spaced points with tabs or ears 45 which are passed through corresponding slots in the base 19 and are then bent over or staked as illustrated most clearly in Figure 3.

The reference character 46 indicates a valve control lever extending through the housing or case 44 and pivotally connected thereto at one end by a pivot pin 47. The valve control lever 46 is substantially channel-shaped and is thus provided with longitudinally extending side flanges 48, one of which is extended to provide a laterally extending arm or ear 49 for a purpose to be shortly referred to.

The free end of the valve control lever 46 is slotted as at 50 to receive a spring clip 51 one end of which engages the inside of the channel portion of the lever 46 whereas the other end of said clip is slotted to engage the neck portion 52 of the valve stem 28 adjacent the spherical end 37. This spring clip 51 acts to hold the valve stem 28 and valve control lever 46 into engagement with one another during the movement of these parts. Movement of the control lever 46 and consequently of the valve stem 28 is limited in one direction by means of an ear 53 provided by cutting and bending at right angles a portion of the case or housing 44.

Mounted on one side of the case or housing 44 is a cam 54. This cam is mounted on a shaft 55 carried by the adjacent side of housing 44. Secured on the end of the shaft 55 and bearing against the cam for frictionally holding the same against accidental rotation is a spring retainer ring 56. The cam 54 is adapted to be oscillated and remotely controlled by a Bowden cable 57 connected to the cam 54 as at 58. For supporting the Bowden cable 57 there is provided a clip 59 secured to the housing 44 with which a clamp 60 cooperates for engaging the Bowden cable. This Bowden cable extends to and through the instrument panel 61 of the motor vehicle where it is provided with an operating knob 62. By means of this Bowden cable the cam 54 may be rotated about its shaft 55 for a purpose to be referred to later in more detail.

Mounted on the arm or ear 49 of the valve control lever 46 is a pin 63. During the oscillation of the cam 54 this pin 63 works in a slot 64 provided in the cam. This slot 64 is of a width to provide clearance around the pin 63 sufficient to permit reciprocation of valve stem 28 during the opening and closing movement of valve 32. However the ends 65 and 66 of this slot are of reduced size so as to snugly receive the pin 63 at the extreme ends of the movement of the cam. Thus when the cam 54 is moved in the direction of arrow A, the pin 63 will be lodged in the reduced end 65 of the slot and when the cam is moved in the direction of arrow B, the pin 63 will be lodged in the reduced end 66 of the slot, for a purpose that will be fully referred to later.

Figure 3:
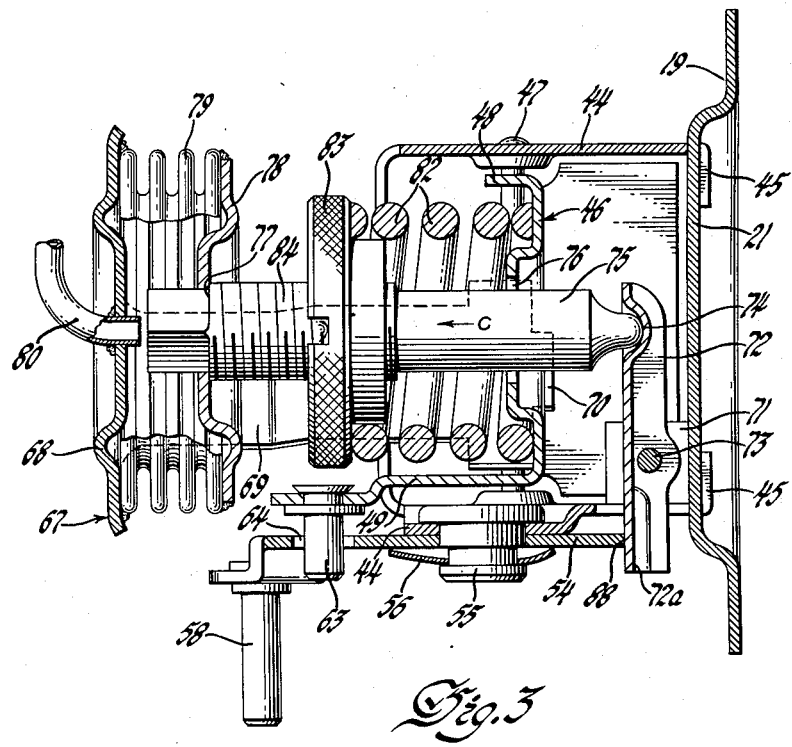
Figure 3 is an enlarged sectional view taken substantially on the plane indicated by line 3—3 in Figure 2, looking in the direction of the arrows.
Figure 6:
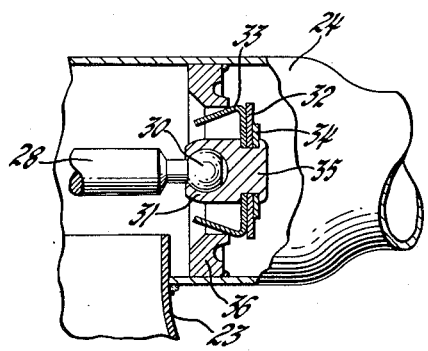
Figure 6 is an enlarged sectional view of the connection between the valve stem and valve.

Mounted on the valve control lever 46 and rigidly secured thereto for movement therewith is a bellows frame 67. This bellows frame 67 comprises a substantially circular portion 68 and a pair of opposed angularly extending arms 69. The ends of the arms 69 are provided with lips or tabs 70 which pass through slots in the lever 46 and are bent over or staked as illustrated in Figures 3 and 4. Thus the bellows frame 67 is rigidly secured to and moves with the valve control lever 46.

Mounted on spaced ears 71 struck out from one of the walls of housing 44 is a cam lever 72. This cam lever is mounted for rocking movement on a pivot shaft 73 extending across said cam lever and supported on said ears. One end of this cam lever is dished as at 74 to receive the end of a bellows stem 75. This bellows stem extends through an aperture 76 in the valve control lever 46 and is provided at its other end with a shoulder 77 upon which rests a head 78. A bellows 79 is interposed between the portion 68 of the bellows frame 67 and the head 78 and is silver soldered or otherwise secured thereto. A capillary tube 80 extends through the frame portion 68 into the interior of the bellows and is securely soldered thereto. This capillary tube may, if desired, be extended to any length and provided with a bulb 81 or if desired the capillary tube and bulb may be eliminated entirely.

In practice the bellows and the capillary tube 80 and bulb 81, if used, are charged with a thermo-responsive fluid. The well-known Freon has been found to work as entirely satisfactorily as the thermo-responsive fluid.

Surrounding the bellows stem 75 is a counterbalancing or range spring 82. At one end this spring engages the valve control lever 46 and the other end engages an adjusting nut 83 mounted on a threaded portion 84 of the bellows stem. The spring 82 is used to counterbalance the pressure exerted in the bellows 79 for a desired or selected air temperature range. Also by adjusting the nut 83 variances in the spring 82 and bellows 79 may be compensated for to fix or adjust the start-to-open temperature of the device. After final adjustment of nut 83 the threads of threaded portion 84 are peened to prevent further turning with the nut 83.

The valve control lever 46 is normally biased in a valve-opening direction by means of auxiliary spring 85. One end of this spring engages in the channel of the valve control lever 46 and is prevented from displacement by means of a lip 86 provided by cutting and bending a portion of the lever 46. The other end of this spring surrounds a lip 87 struck from an adjacent portion of the case or housing 44.

The cam lever 72 is preferably provided with a projection in the form of a rib 72a adapted to engage the cam face or surface 88 of the cam member 54. This cam face or surface 88 is developed so that when the cam 54 is moved in the direction of arrow A, the cam lever 72 is rocked about its pivot 73 to move the bellows stem 75 in the direction of arrow C. Obviously, therefore, when the cam 54 is moved in the direction of arrow B, the cam lever 72 rocks in the opposite direction and the bellows stem 75 moves in a direction opposite to that indicated by arrow C.

When the cam 54 is moved in the direction of arrow A and cam lever 72 moves bellows stem 75 in the direction of arrow C, the engagement of shoulder 77 on bellows stem 75 with the head 78 acts to compress bellows 79 and through bellows frame 67 rocks valve control lever 46 in valve-closing direction. With the parts left in such an adjusted position, a smaller bellows movement is necessary or required to close the valve.

When the cam member 54 is moved in the direction indicated by arrow B, the contrary is true. Under these conditions the cam lever 72 is rocked in the opposite direction and the bellows stem 75 moves in the direction opposite to that indicated by arrow C whereupon the bellows is extended requiring more bellows movement to move the valve 32 to a fully closed position.

When the cam lever 72 is rocked to move the bellows stem in the direction of arrow C, the bellows 79 is not only compressed but the bellows frame 67 is also bodily shifted which in turn rocks the valve control lever 46 to move the valve towards closed position. When the cam lever 72 is rocked in the other direction and the bellows stem 75 moves in the direction opposite to that indicated by arrow C, the bellows is permitted to expand and the valve control lever 45 under the influence of auxiliary spring 85 moves the valve away from its seat.

Thus by properly adjusting the cam 54, by means of Bowden cable 57 and knob 62, the thermo-responsive means will be adjusted to actuate or open and close the valve within different ranges of temperature variation.

When the valve 32 is opened, the heating fluid will flow through conduit 16 and pipe 23, thence through the valve and through pipe 24 and conduit 17 to the heat exchanger 14 and thence from the heat exchanger 14 through conduit 18 back to the radiator.

A typical operation of the device under average cold weather conditions will now be described. If the cam 54 is adjusted to substantially the position illustrated in Figure 2, the air temperature surrounding the bellows 79 or surrounding the capillary tube 80 or capillary tube and bulb 81 must rise to 70 degrees Fahrenheit to expand the thermo-responsive fluid sufficiently to close the valve 32 and thus cut off the supply of heating fluid to the heat exchanger. Therefore at any temperature lower than 70 degrees Fahrenheit, the bellows contracts in proportion to the ambient air temperature and the valve is moved to partially open or fully open position. As the ambient air temperature rises, the thermo-responsive fluid expands thus expanding the bellows and moving the valve toward closed position in proportion to the variances in the air temperature. By properly adjusting the cam 54, the air temperature at which the valve 32 will be closed or opened may be regulated as will be apparent.

It may be desirable to lock the valve 32 in either fully closed or fully opened position so that the valve is not actuated by variations in the ambient air temperature. For this purpose the reduced end portions 65 and 66 are provided in the slot 64 of cam 54. With this arrangement when the cam 54 is moved in the direction indicated by arrow A whereby the pin 63, carried by the valve control lever 46, is lodged in the reduced end 65 of the slot, the valve is fully closed and when the cam 54 is moved in the direction of arrow B and the pin 63 is lodged in the reduced end 66 of the cam slot, the valve 32 is in full open position. One wall of the slot 64 adjacent the reduced end 65 is provided with a hump or shoulder 65a and another wall of the slot 64 adjacent the reduced end 66 is provided with a hump or shoulder 66a over which the pin 63 passes in the extreme positions of adjustment of the cam 54. When the cam 54 has been thus adjusted to hold the valve 32 in either fully closed or fully opened position, the valve is not affected by ambient air temperature changes.

Various changes and modifications may be made in the construction and arrangement of parts as may come within the purview of the accompanying claims.

I claim:

1. In a device for controlling the flow of heating fluid to a heat exchanger, a conduit connecting a source of heating fluid to the heat exchanger, a valve in said conduit, a valve stem therefor, a valve control lever connected to said valve stem, means biasing said control lever in valve-opening direction, thermo-responsive means in the form of a bellows connected to said control lever for actuating said valve, adjustable spring means interposed between said bellows and control lever to counterbalance the bellows pressure, a bellows stem connected to said bellows, a cam lever connected to said bellows stem, and cam means for actuating said cam lever to adjust the static positions of said thermo-responsive means and control lever to cause said thermo-responsive means to open and close said valve within different ranges of temperature variation.

2. In a device for controlling the flow of heating fluid to a heat exchanger, a conduit connecting a source of heating fluid to the heat exchanger, a valve in said conduit, a valve stem therefor, a valve control lever connected to said valve stem, means biasing said control lever in valve-opening direction, thermo-responsive means in the form of a bellows, a bellows frame connecting said bellows to said control lever, a cam lever, a bellows stem extending through said control lever and connecting said bellows to said cam lever, adjustable spring means connected to said bellows stem and interposed between said bellows and control lever for counterbalancing the bellows pressure, and cam means acting on said cam lever for adjusting the static positions of said thermo-responsive means and control lever to cause said thermo-responsive means to open and close said valve within different ranges of temperature variation.

3. In a device for controlling the flow of heating fluid to a heat exchanger, a conduit connecting a source of heating fluid to the heat exchanger, a valve in said conduit, a valve stem therefor, a valve control lever connected to said valve stem, means biasing said control lever in valve-opening direction, thermo-responsive means in the form of a bellows, a bellows frame connecting said bellows to said control lever, a cam lever, a bellows stem extending through said control lever and connecting said bellows to said cam lever, adjustable spring means connected to said bellows stem and interposed between said bellows and control lever for counterbalancing the bellows pressure, and means on said cam for locking said valve in closed and open position.

4. In a device for controlling the flow of heating fluid to a heat exchanger, a conduit connecting a source of heating fluid to the heat exchanger, a valve in said conduit, a control lever operatively connected to said valve, means for biasing said control lever in valve opening direction, thermo-responsive means mounted on said control lever for actuating said valve, cam lever means, and means operatively connecting said thermo-responsive means to said cam lever means and adapted for movement relative to said control lever.

5. In a device for controlling the flow of heating fluid to a heat exchanger, a conduit connecting a source of heating fluid to the heat exchanger, a valve in said conduit, a control lever operatively connected to said valve, means for biasing said control lever in valve opening direction, thermo-responsive means mounted on said control lever for actuating said valve, cam means, means operatively connecting said thermo-responsive means to said cam means and adapted for movement relative to said control lever, means on said cam means for locking said valve against movement in open position, and additional means for locking said valve in closed position.

6. In a device of the class described, a conduit, a valve mounted in said conduit, a control lever operatively connected to said valve, spring means for biasing said control lever in valve opening direction, thermo-responsive means mounted on said control lever and being bodily movable therewith for actuating said valve, cam lever means, means operatively connecting said thermo-responsive means to said cam lever means and adapted for movement relative to said control lever, and adjustable spring means disposed between said thermo-responsive means and said control lever and engaging said lever for counterbalancing the said thermo-responsive means.

7. In a device of the class described, a conduit, a valve mounted in said conduit, a control lever operatively connected to said valve, spring means for biasing said control lever in valve opening direction, a frame secured to said lever for bodily movement therewith, thermo-responsive means mounted in said frame for actuating said control lever and valve, cam means, and means operatively connecting said thermo-responsive means to said cam means and adapted for movement relative to said control lever, whereby said cam means may adjust said thermo-responsive means to cause the latter to actuate said valve within different ranges of temperature variation.

8. In a device of the class described, a conduit, a valve mounted in said conduit, a valve stem for said valve, a control lever connected to said valve stem, spring means for biasing said control lever in valve opening direction, thermo-responsive means mounted on said control lever and being bodily movable therewith for actuating said valve, and cam means operatively connected to said thermo-responsive means for adjusting the static positions of the latter and said control lever to cause said thermo-responsive means to operate said valve within different ranges of temperature variation.

9. In a device for controlling the flow of heating fluid to a heat exchanger, a conduit connecting a source of fluid to the heat exchanger, a valve in said conduit, a control lever operatively connected to said valve, means for biasing said control lever in valve opening direction, thermo-responsive means connected to and mounted for bodily movement with said control lever for actuating said valve, cam means operatively connected to said thermo-responsive means for adjusting the static positions of the latter and said control lever to cause said thermo-responsive means to operate said valve within different ranges of temperature variation, and adjustable spring means operating against said control lever and said thermo-responsive means to counterbalance the latter.

10. In a device for controlling the flow of fluid to a heat exchanger, a conduit connecting the said heat exchanger to a source of fluid supply, a valve in said conduit, a control lever for operating said valve, thermo-responsive means for operating said control lever, a yoke secured to said control lever and supporting one end of said thermo-responsive means, a stem engaging the opposite end of said thermo-responsive means, means for holding said stem against axial movement in one direction, a spring disposed between the opposite end of said thermo-responsive means and said control lever and in engagement with the latter, and means for adjusting said spring to vary the operating characteristics of said thermo-responsive means.

11. In a device for controlling the flow of fluid to a heat exchanger, a conduit connecting said heat exchanger to a source of fluid supply, a valve in said conduit, a control lever for operating said control valve, thermo-responsive means for operating said control lever, a frame secured to said control lever and supporting one end of said thermo-responsive means, a stem engaging the opposite end of said thermo-responsive means, means for holding said stem against axial movement in one direction, a spring disposed between the opposite end of said thermo-responsive means and said control lever and engaging the latter, means for adjusting said spring to vary operating characteristics of said thermo-responsive means, and remotely controlled means for adjusting said holding means to further vary the operating characteristics of said thermo-responsive means.

12. In a device for controlling the flow of fluid to a heat exchanger, a conduit connecting said heat exchanger to a source of fluid supply, a valve in said conduit, a control lever for operating said valve, thermo-responsive means for operating said control lever, a frame secured to said control lever and supporting one end of said thermo-responsive means, a stem engaging the opposite end of said thermo-responsive means, means for holding said stem against axial movement in one direction, a spring disposed between the said opposite end of said thermo-responsive means and said control lever and engaging the latter, means on said stem for adjusting the pressure of said spring to vary the operating characteristics of said thermo-responsive means, remotely controlled means for adjusting said holding means to further vary the operating characteristics of said thermo-responsive means, means on said adjusting means for locking said valve means in open position, and additional means on said adjusting means for locking said valve in closed position.

ARTHUR J. SCHUTT.

References Cited in the file of this patent

UNITED STATES PATENTS

| Number | Name | Date |
|---|---|---|
| 1,514,933 | Roys | Nov. 11, 1924 |
| 1,795,860 | Jaeger | Mar. 10, 1931 |
| 1,837,066 | Portham | Dec. 15, 1931 |
| 1,847,911 | Trane | Mar. 1, 1932 |
| 1,885,305 | Sutton | Nov. 1, 1932 |
| 1,950,240 | Hilgenberg | Mar. 6, 1934 |
| 2,022,583 | Bicknell | Nov. 26, 1935 |
| 2,123,920 | Andersson | July 19, 1938 |
| 2,207,865 | Knight | July 16, 1940 |
| 2,338,563 | Andersson | Jan. 4, 1944 |
| 2,339,087 | Mantz | Jan. 11, 1944 |

FOREIGN PATENTS

| Number | Country | Date |
|---|---|---|
| 659,696 | France | Feb. 5, 1929 |